Oct. 4, 1927.
W. WISHART
1,643,971
STUFFING BOX
Filed Feb. 6, 1926
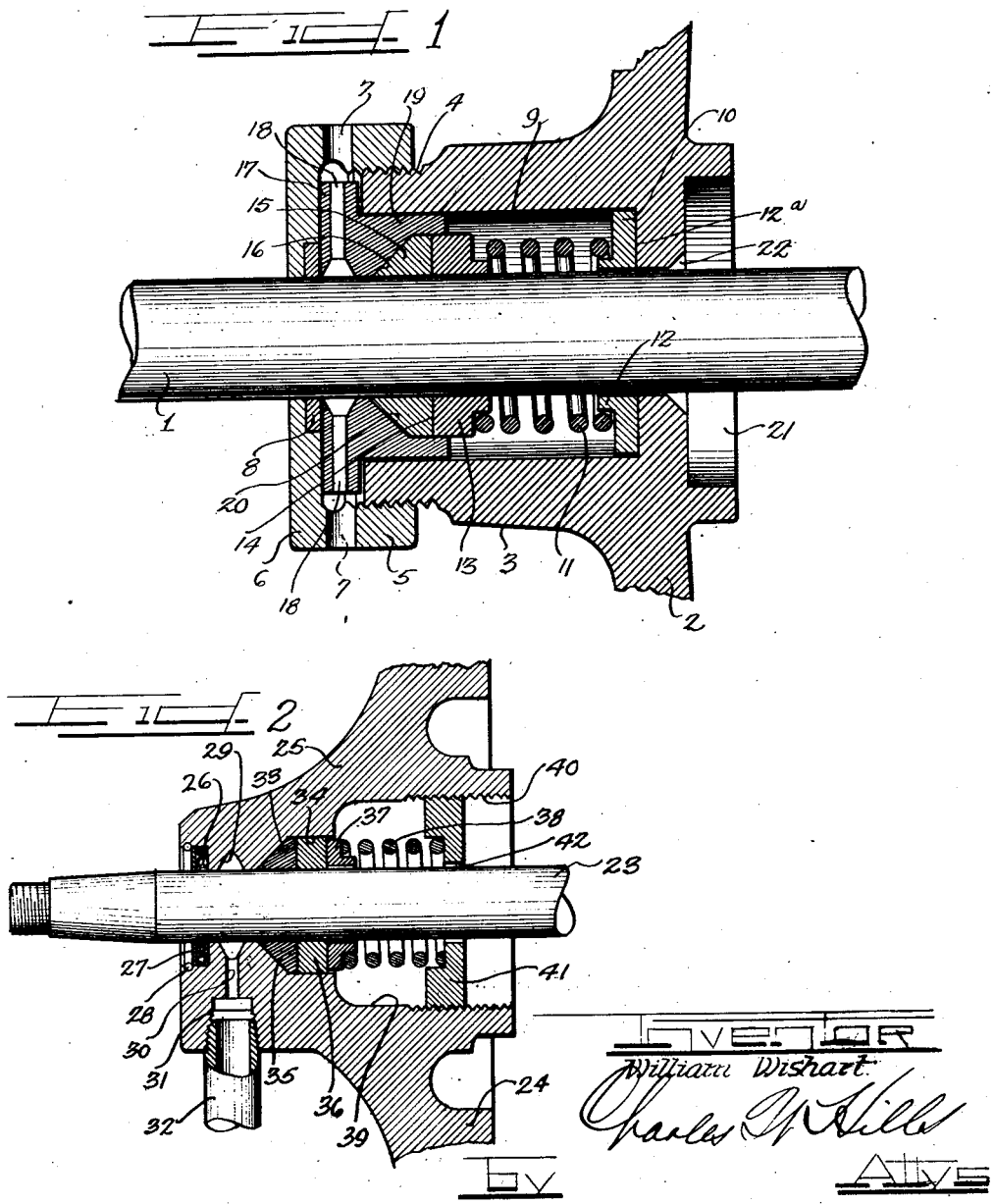

Patented Oct. 4, 1927

1,643,971

UNITED STATES PATENT OFFICE.

WILLIAM WISHART, OF CLINTON, IOWA, ASSIGNOR TO CLIMAX ENGINEERING COMPANY, OF CLINTON, IOWA, A CORPORATION OF DELAWARE.

STUFFING BOX.

Application filed February 6, 1926. Serial No. 86,408.

This invention relates to a compressor stuffing box and more particularly to an improved packing arrangement for surrounding the compressor shaft and affording a unit wherein the internal pressure within the stuffing box housing is utilized for the purpose of compressing the packing along inclined or beveled surfaces to insure a non-leaking joint.

It is an object of this invention to provide a compressor stuffing box with packing members wherein said packing members are compressed along inclined surfaces due to the pressure within the stuffing box housing.

It is also an object of this invention to provide a compressor stuffing box wherein the internal pressure from the compressor crank shaft housing enters the stuffing box and acts to hold packing members in tight engagement with the peripheral surface of the compressor shaft.

It is an important object of this invention to provide a stuffing box with spring controlled packing members which are not only acted upon by a control spring but by the pressure within the stuffing box to cause pressure to be exerted along inclined surfaces of certain of the packing members to afford a non-leaking joint around a shaft projecting through the stuffing box.

Other and further objects of this invention will be apparent from the disclosures in the specification and accompanying drawings.

The invention in a preferred form is illustrated in the drawings and hereinafter more fully described.

On the drawings:

Figure 1 illustrates a fragmentary detail section taken longitudinally through a compressor stuffing box enclosing improved packing mechanisms engaged around a shaft, said packing mechanism embodying the principles of this invention.

Figure 2 is a fragmentary longitudinal section of a modified form of packing mechanism for a compressor stuffing box.

As shown on the drawings:

The reference numeral 1 indicates a machine or compressor shaft which projects from the compressor crank shaft housing 2 through a stuffing box casing 3 integrally formed on said housing and having the end thereof reduced in diameter and externally threaded at 4. Engaged over the outer portion of the shaft 1 and removably threaded onto the threaded end 4 of the stuffing box casing 3 is the internally threaded flange 5 of a retaining cap 6. The retaining cap 6 is provided with a plurality of radially disposed lubricating passages 7. The inner face of the retaining cap 6 is provided with a central recess in which a packing ring or washer 8 is seated engaged around the shaft 1. The stuffing box casing is formed to afford a chamber 9, in one end of which a flanged ring 10 is seated around said shaft 1. Engaged around the shaft 1 within the chamber 9 is a coiled spring 11, one end of which seats around a flange 12 of the ring 10 and holds said ring resiliently against the inner end wall 12$^a$ of the stuffing box casing. The outer end of the control spring 11 engages around a flanged portion of a packing ring 13 to hold the same in resilient contact with the inner end face 14 of a packing member 15, the outer end of which is beveled to afford a conical surface 16. Positioned around the shaft 1 between the inner face of the retaining cap 6 and the end surface of the threaded portion 4 of the stuffing box casing 3 is a packing disk 17 provided with a plurality of radially directed lubricating passages 18 to permit a lubricant delivered through the packing disk passages 18 to lubricate the shaft 1 and parts of the stuffing box. Integrally formed on the inner face of the packing disk 17 is a shank 19 provided with a conical or beveled recess or seat 20, the outer end of which is cylindrical in form. The beveled recess is adapted to receive the beveled or conical end of the packing ring 15 while the cylindrical portion of the recess in the shank 19 is adapted to receive the outer end of the packing ring 13 as clearly illustrated on the drawings. The wall separating the stuffing box chamber 9 from the crank shaft chamber 21 of the compressor is provided with a central opening at 22 to permit the pressure from the crank shaft chamber 21 to pass between the shaft and the inner peripheral surface of the packing 10 to enter the stuffing box chamber 9.

When the stuffing box is assembled as illustrated in the drawings and as described in the specification the pressure from the crank shaft housing entering the stuffing box chamber 9 acts in conjunction with the coiled spring 11 to separate the members 10 and 13. The spring furthermore acts to exert additional pressure upon the packing member 13 which in turn, being in contact with the beveled packing ring 15 acts to compress said beveled packing ring as well as the shank portion 19 of the packing disk 17 so that the internal pressure within the stuffing box chamber 9 is actually utilized to compress the packing around the shaft 1 with the line of pressure being exerted along the inclined or conical surface 16 of the beveled end of the packing ring 15 and along the beveled surface 20 of the packing ring shank 19. It will thus be seen that the improved stuffing box packing arrangement is an improvement in the art inasmuch as the pressure from the crank shaft housing is utilized within the stuffing box chamber 9 for the purpose of compressing the packing members to make the same form a tight joint around the portion of the shaft 1 which projects through the stuffing box 3 and the packing retaining cap 6 engaged thereon.

Figure 2 illustrates a modified form of a compressor stuffing box mechanism wherein the reference numeral 23 indicates a compressor shaft which projects from a compressor crank shaft housing 24 through a stuffing box casing or hub section 25. The casing 25 is integrally formed on the housing 24 and has the outer end thereof provided with a recess within which a felt washer 26 is seated. Positioned in said recess to the outside of the washer 26 is a ring disk 27 held in place by a retaining ring 28. Formed in the casing 25 to the inside of the felt washer 26 is a lubricating groove 29 with which an outlet passage 30 connects. Threaded into a threaded recess 31 of the stuffing box housing is the threaded end of an oil drain pipe 32. Also formed in the casing 25 to the inside of the groove 29 is a beveled recess or seat 33 which communicates with a cylindrical recess 34. Seated in the conical seat 33 is a beveled or conical metallic packing ring 35. A metallic packing ring 36 is engaged in the recess 34 adjacent the conical packing ring 35. A flanged retaining ring 37 is resiliently held in contact with the packing ring 36 by a coiled spring 38 engaged around the shaft 23 within a large recess 39 formed in the stuffing box casing 25. The recess 39 is provided with a threaded portion 40 into which a threaded ring 41 is adjustably engaged to provide a means for holding the spring 38 in place and for varying the compression of said spring. The ring 41 has a central opening 42 to permit the pressure from the crank shaft chamber of the housing 24 to pass between the shaft 23 and the inner peripheral surface of the ring 41 to enter the stuffing box chamber 39 between the retaining ring 37 and the adjustable ring 41.

The pressure from the crank shaft housing 24 is permitted to enter the stuffing box chamber 39 and acts in conjunction with the coiled spring 38 to separate the rings 37 and 41. The spring 38 and the pressure within the chamber 39 act to compress the metallic packing rings 35 and 36. The pressure in the chamber 39 is thus used to compress the packing rings around the shaft 23 with the line of pressure being exerted along the inclined or conical surface of the beveled end of the packing ring 35.

I am aware that many changes may be made and numerous details of construction may be varied through a wide range without departing from the principles of this invention and I therefore do not purpose limiting the patent granted hereon otherwise than necessitated by the prior art.

I claim as my invention:

The combination with a stuffing box, of a shaft projecting therethrough, a radially passaged cap removably secured to one end of said stuffing box, a packing disk between said cap and the end of said stuffing box and having a plurality of radial passages therein, a shank integrally formed on said packing disk having a conical recess therein, a conical packing ring seated in said conical recess, a pair of packing rings in said stuffing box, and resilient means separating said pair of packing rings and furthermore acting to resiliently hold said conical packing ring seated in position.

In testimony whereof I have hereunto subscribed my name.

WILLIAM WISHART.